United States Patent [19]

Caruso

[11] Patent Number: 4,899,637
[45] Date of Patent: Feb. 13, 1990

[54] OSCILATORY HYDRAULIC ACTUATORS WITH INTERNAL SUPPLY, RETURN, AND CONTROL PASSAGEWAYS FOR MULTI-AXIS WRIST ACTUATOR

[75] Inventor: John T. Caruso, Kenmore, N.Y.

[73] Assignee: Moog Controls Inc., East Aurora, N.Y.

[21] Appl. No.: 638,564

[22] Filed: Sep. 17, 1984

Related U.S. Application Data

[63] Continuation of Ser. No. 367,625, Apr. 12, 1982, abandoned.

[51] Int. Cl.$^4$ ............................ F01C 9/00; B25J 17/02
[52] U.S. Cl. ........................................ 91/173; 91/177; 91/361; 91/530; 92/164; 901/22; 901/29; 414/4; 137/580
[58] Field of Search ................. 91/508, 530, 531, 173, 91/177, 361; 92/2, 121, 120, 146, 161, 147, 66–67, 164; 414/4, 732, 735, 730, 738; 901/22, 37, 29; 137/580

[56] References Cited

U.S. PATENT DOCUMENTS

| | | | |
|---|---|---|---|
| 2,442,530 | 6/1948 | Eberle et al. | 623/26 |
| 2,528,464 | 10/1950 | Wilkerson et al. | 92/165 R X |
| 2,605,474 | 8/1952 | Oliver | 623/26 |
| 2,629,876 | 3/1953 | Fullerton et al. | 623/26 |
| 2,861,701 | 11/1958 | Bergsland et al. | 414/728 |
| 3,289,544 | 12/1966 | Daniels | 91/167 A |
| 3,454,169 | 7/1969 | Bridges | 172/781 |
| 3,543,910 | 12/1970 | Devel et al. | 414/728 |
| 3,683,747 | 8/1972 | Petit | 91/530 |
| 3,739,923 | 6/1973 | Totsuka | 414/735 |
| 3,954,188 | 5/1976 | Boyle | 414/735 |
| 3,975,989 | 8/1976 | Hirmann | 92/48 |
| 3,984,009 | 10/1976 | Holroyd | 414/728 |
| 4,062,455 | 12/1977 | Flatau | 414/735 |
| 4,096,766 | 6/1978 | Pardo et al. | 74/640 |
| 4,351,628 | 9/1982 | Drexel et al. | 92/165 PR |
| 4,372,721 | 2/1983 | Harjar et al. | 414/730 |
| 4,459,898 | 7/1984 | Harjar et al. | 414/730 X |

FOREIGN PATENT DOCUMENTS

| | | | |
|---|---|---|---|
| 2815298 | 10/1979 | Fed. Rep. of Germany | 92/121 |
| 3022162 | 12/1981 | Fed. Rep. of Germany | 414/730 |
| 514551 | 8/1939 | United Kingdom . | |
| 1256798 | 12/1971 | United Kingdom . | |

OTHER PUBLICATIONS

Jacobs, E. "Minicomputer Controls Six Electrohydraulic Actuators," in *Hydraulics and Pneumatics* v. 35, 2: 53–8, Feb. 1982.

*Primary Examiner*—Robert E. Garrett
*Assistant Examiner*—George Kapsalas
*Attorney, Agent, or Firm*—Sommer & Sommer

[57] ABSTRACT

A rotary actuator includes a shaft rotatably mounted on a body, and a servovalve arranged to operate a vane motor for selectively rotating the shaft relative to the body. A portion of the shaft extends beyond the body. Supply and return passages are provided to the body and shaft so that fluid power supplied to the body is supplied to the servovalve and is also available at the end of the shaft beyond the body. Two or more such rotary actuators may be connected by intermediate brackets to provide a wrist actuator capable of movement about axes.

22 Claims, 4 Drawing Sheets

OSCILATORY HYDRAULIC ACTUATORS WITH INTERNAL SUPPLY, RETURN, AND CONTROL PASSAGEWAYS FOR MULTI-AXIS WRIST ACTUATOR

This is a continuation of Ser. No. 367,625, filed on Apr. 12, 1982, now abandoned.

BACKGROUND OF THE INVENTION

1. Field of the Invention:

The present invention relates generally to the field of fluid-powered actuators, and more particularly to an improved rotary actuator which may be usefully employed in a wrist actuator capable of movement about multiple axes.

2. Description of the Prior Art

A fluid-powered rotary actuator is basically a device for converting pressurized fluid flow into rotational movement of a shaft relative to a body. Many forms of such rotary actuators have been developed heretofore. It is also known that an electrohydraulic servovalve may be used to control movement of the shaft relative to the body.

In recent years, there has been increasing interest in the development of robots for the performance of mechanical acts, such as on automobile assembly lines and the like. Such robots have been designed with degrees of freedom comparable to human joints. The human wrist, for example, is capable of rotational movement about three mutually perpendicular axes, and may be selectively positioned by extension or retraction of the person's arm. The desire to develop satisfactory robots has lead to a concomitant desire to develop actuators simulating human joints.

Earlier efforts at such robots and actuators are shown in the following U.S. Pat. Nos. 3,984,009; 3,739,923; 2,861,701; 4,096,766; 4,062,455, 2,528,464; 3,954,188; 3,543,910; 3,454,169; 2,629,876; 3,605,474; and 2,422,530.

SUMMARY OF THE INVENTION

The present invention provides an improved rotary actuator, and a wrist-like multi-axis actuator employing same, wherein fluid supply, return and control connections are all provided by internal passageways, rather than through use of external hoses and hose fittings.

In one aspect, the invention broadly provides an improvement in a rotary actuator which includes a body, a shaft rotatably mounted on the body and having one portion arranged within the body and another portion arranged external to the body, a valve having a supply port adapted to be provided with fluid at a supply pressure and selectively operable to provide a control pressure, and a motor provided with the control pressure and operative to urge the shaft to rotate relative to the body. The improvement includes a supply passage provided in the body and extending between an inlet port adapted to be provided with supply pressure, the valve, and an outlet supply port opening onto a surface of the external portion of the shaft; whereby pressurized fluid provided to the body inlet port will be provided to the valve and will also be provided to the shaft outer portion at a location beyond the body.

In another aspect, the invention provides an improved actuator which minimally includes a rotary actuator having a servovalve, a body, a shaft rotatably mounted on the body and having one portion arranged within the body and another portion arranged external to the body, a motor associated with the servovalve and operative to urge the shaft to rotate relative to the body, and a supply passage communicating an inlet port on the body with the servovalve and with an outlet port on the external portion of the shaft; and a bracket mounted fast to the external portion of the shaft for rotation therewith, the bracket provided with an internal supply passage communicating with the shaft outlet port, and an outlet port contained in the bracket, whereby pressurized fluid supplied to the body inlet port will be provided to the bracket outlet port.

One object of the invention is to provide an improved rotary actuator having a labyrinth of communicating internal passageways such that supply pressure provided to a body inlet port will be provided to the valve and to a commutating port at the interface surface between the body and the shaft, and the shaft provided with an internal passageway connecting the commutating port to an outlet port on the external portion of the shaft.

Another object is to provide an improved rotary actuator having another labyrinth of internal passageways such that return fluid provided to a shaft inlet port located beyond the body, together with return fluid from the valve, will be available at a body return port.

Another object is to provide an improved rotary actuator which is particularly adapted for use as a component of a wrist actuator, capable of pivotal movement about any of three perpendicular axes.

Still another object is to provide an improved wrist actuator having three rotary actuators each containing a servovalve and a motor, whereby the three actuators are connected by two intermediate brackets, with the supply and return ports of the three servovalves being hydraulically connected in parallel, and without requiring supply and return hoses external of the apparatus.

These explicit and other implicit objects and advantages will become apparent from the foregoing and ongoing written specification, the drawings, and the appended claims.

DESCRIPTION OF THE PREFERRED EMBODIMENTS

At the outset, it should be clearly understood that like reference numerals are intended to identify the same elements, structure or surfaces consistently throughout the several drawing figures, as such elements, structure or surfaces may be further described or explained by the entire written specification, of which this detailed description is an integral part. As used herein, expressions such as "left", "right", "up", "down", and the like, are oriented to the indicated drawing figure as it faces the reader.

Improved Rotary Actuator (FIGS. 1–4)

Referring now to FIGS. 1–4, the invention provides, in one aspect, an improved rotary actuator, of which the presently preferred embodiment is generally indicated at 10.

Rotary actuator 10 is shown as broadly including an assembled body, collectively indicated at 11, a shaft 12 rotatably mounted on the body, a servovalve 13, and a vane-type motor 14 (FIG. 3) operatively arranged to urge the shaft to rotate relative to the body.

Applicant's improvement centers around the provision of communicating supply passages 15, 16 in the body and shaft, respectively, so that supply pressure provided to a body supply passage inlet port 18 from some external source (not shown) is provided to the valve, and is also made available at the distal end of the shaft, for a purpose hereinafter discussed. Preferably, these supply passages are accompanied by communicating body and shaft return passages 19, 20 which are available to convey a flow of return fluid from the valve and/or the distal end of the shaft to a body return passage outlet port 21.

Figure 4:
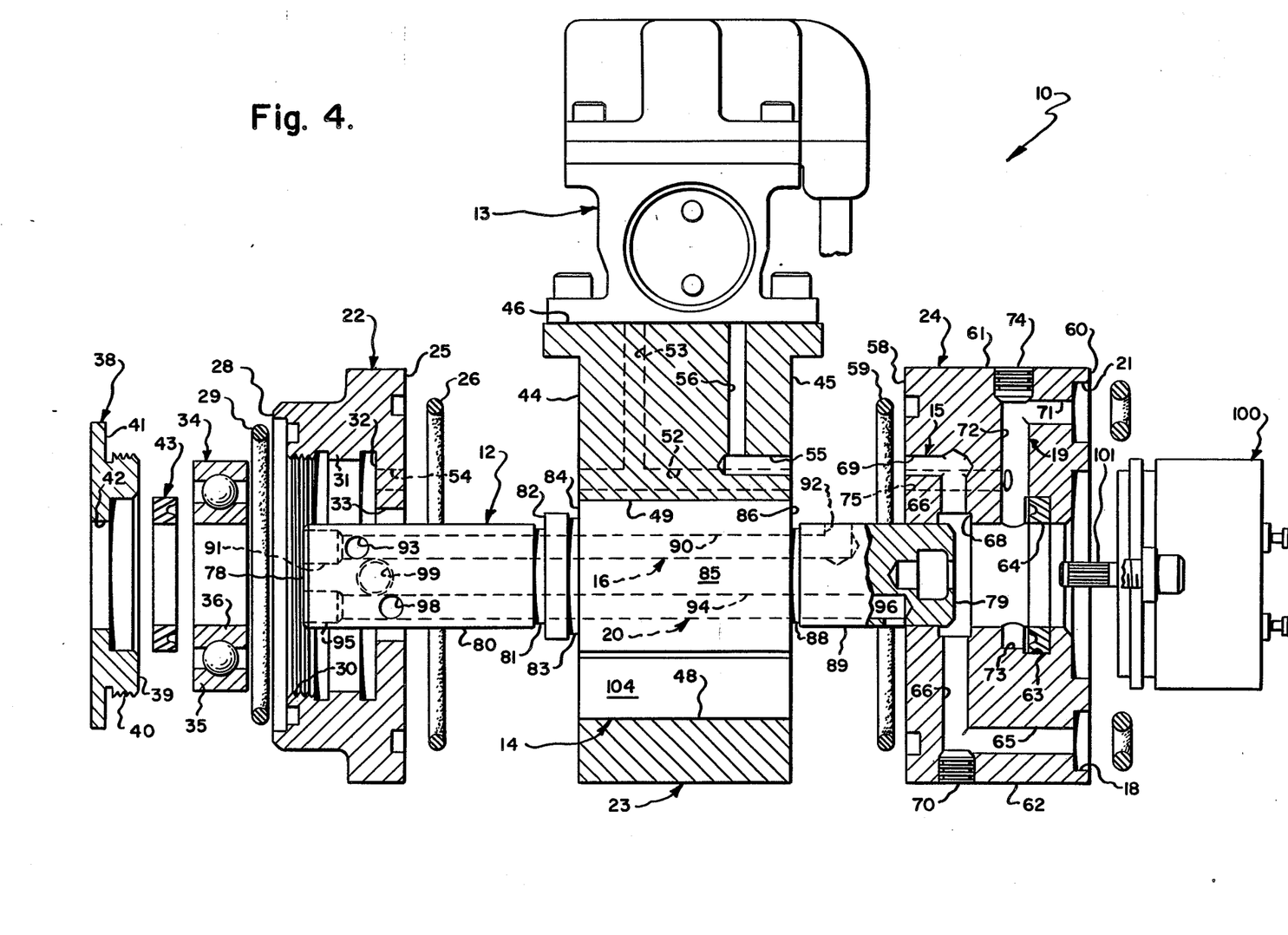
FIG. 4 is an exploded view of the actuator shown in FIG. 1, this view being provided for the principal purpose of identifying its structure without obfuscating the assembled view with a plethora of lead lines and reference numerals.

The structure of the improved rotary actuator will now be described with particular reference to the exploded view of FIG. 4.

Body 11

Figures 1, 2, 3:
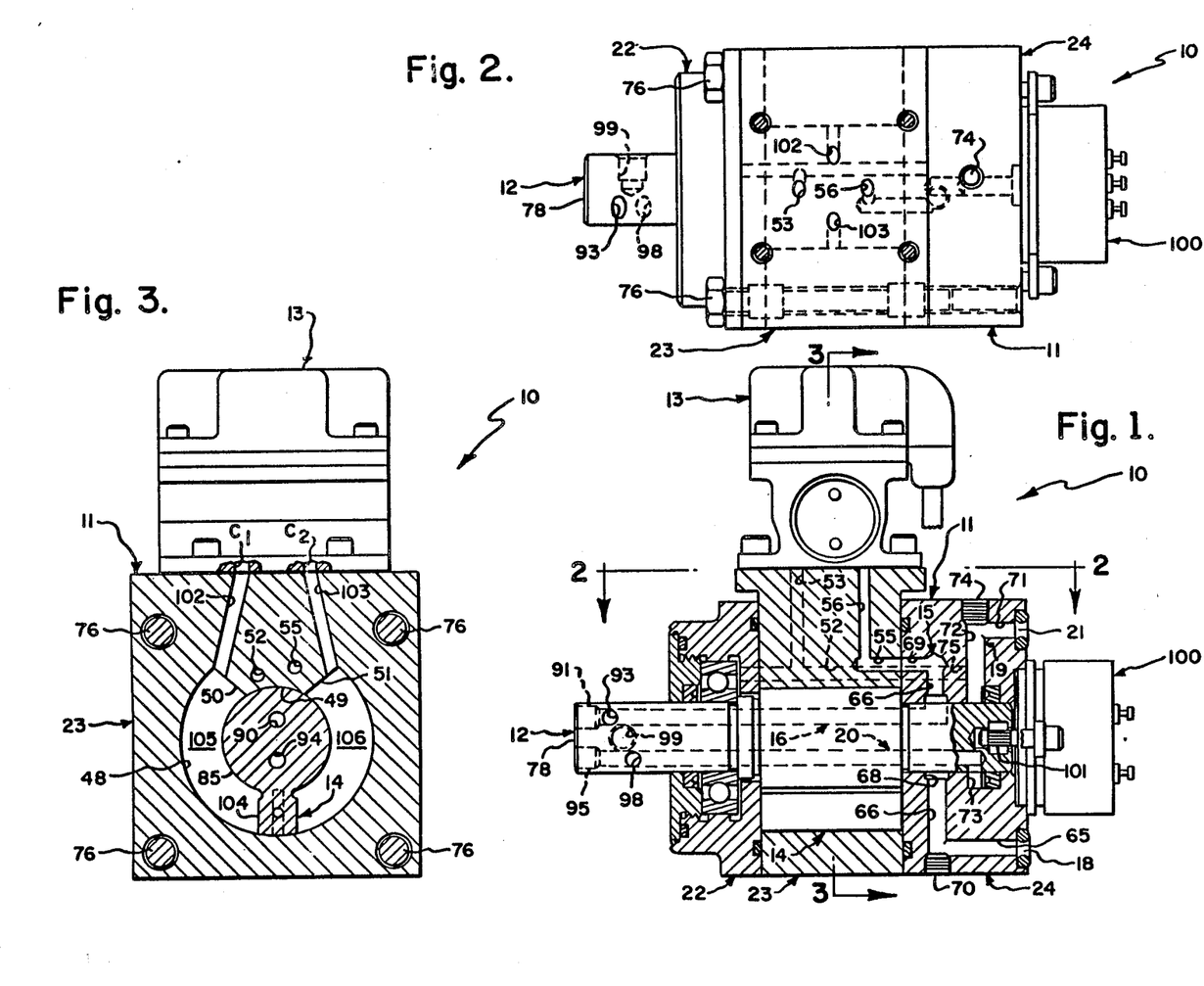
FIG. 1 is a longitudinal vertical sectional view of the improved rotary actuator, but showing the servovalve in elevation.
FIG. 2 is a horizontal sectional view thereof, this view taken generally on line 2—2 of FIG. 1 and looking in the direction of the arrows at the top of the body.
FIG. 3 is a transverse vertical sectional view thereof, taken generally on line 3—3 of FIG. 1 and looking in the direction of the arrows.

As best shown in FIG. 1, the body is formed by suitably assembling a left section 22, and intermediate section 23, and a right section 24.

Body left section 22 is shown as including, inter alia, a planar vertical right face 25, from which a large diameter annular recess extends leftwardly into the left section to accommodate an O-Ring 26; an opposite annular vertical left face 28, from which a circular recess extends rightwardly into the left section to accommodate an O-Ring 29; and a specially-configured through-bore communicating the end faces and including, in pertinent part (from left to right in FIG. 4), an internally-threaded portion 30 extending rightwardly from left face 28, an inwardly-extending annular boss 31, a leftwardly-facing annular vertical shoulder 32, and a cylindrical surface 33 continuing rightwardly therefrom to join right face 25.

A bearing assembly 34 is mounted on the left section with its right face arranged adjacent shoulder 32, and has its outer race 35 engaging the inwardly-facing cylindrical surface of boss 31. The bearing's inner race 36 engages a proximate portion of shaft 12.

An annular left end cap 38 is mounted on the left section. End cap 38 has an annular vertical right face 39 engaging the left face of bearing assembly 34, has an externally-threaded portion 40 extending leftwardly therefrom and adapted to engage left section internally-threaded portion 30, and has a rightwardly-facing annular vertical surface 41 arranged to compressively engage O-Ring 29 and abut section left face 28. An annular corner recess extends into the end cap from its inwardly-facing cylindrical surface 42 and its right face 39 to accommodate a resilient annular seal 43, having a somewhat C-shaped cross-section. The inwardly-facing cylindrical surface of seal 43 wipingly engages a proximate portion of shaft 12.

The body intermediate section 23 is shown as having a planar vertical left face 44 arranged to compress O-Ring 26 and abut left section right face 25, a planar vertical right face 45, and an uppermost planar horizontal surface 46, against which the servovalve is mounted. The intermediate section is also provided with a specially-configured through-bore having a somewhat C-shaped appearance when viewed in transverse cross-section (FIG. 3). Specifically, this through-bore is bounded by a relatively-large diameter cylindrical surface segment 48 occupying an arc of about 280 degrees, a smaller diameter cylindrical surface 49 occupying an arc of about 60 degrees, and planar surfaces 50, 51 symmetrically joining these surfaces.

The intermediate section is further provides with a plurality of drilled holes which form parts of the body supply and return passages. Specifically, a horizontal hole 52 extends through the intermediate section above its through-bore, and is intersected by a hole 53 extending downwardly from section upper surface 46. Holes 52 and 53 constitute a part of the body return passage 19. If desired, body hole 52 may communicate with an aligned hole 54 in the left body section to relieve pressure in the vicinity of the bearing. A horizontal hole 55 extends leftwardly into the intermediate section from its right face, and is intersected by a hole 56 extending downwardly from upper surface 46. Holes 55 and 56 constitute part of the body supply passage 15.

The right body section 24 has a planar vertical left face 58, from which a relatively large diameter annular recess extends rightwardly into the section to accommodate an O-Ring 59; an opposite planar vertical right face 60, and planar horizontal upper and lower surfaces 61, 62, respectively. The right face 45 of the intermediate section is arranged to compressively engage O-Ring 59 and abut the left face 58 of the right section. The right section is also provided with a through-bore bounded by an inwardly-facing cylindrical surface 63, and has an annular recess extending outwardly into the section to accommodate an annular resilient seal 64, the inwardly-facing cylindrical surface of which wipingly engaged a proximate portion of shaft 12.

The right section is provided with a plurality of holes and recesses which form other portions of the body supply and return passages 15, 19. Specifically, a horizontal hole 65 extends into the section from inlet port 18, and is intersected by a hole 66 extending upwardly from lower surface 62 to intersect an annular recess 68 encircling the bore, and continuing therebeyond. A horizontal hole 69, aligned with intermediate section hole 55, extends into the right section from its left face to intersect the extension hole 66. Hole 66 is tapped between body lower surface 62 and hole 65 to receive a suitable closure plug 70. A horizontal hole 71 extends leftwardly into the right section from outlet port 21, and is intersected by a hole 72 extending downwardly from body upper surface 61 to intersect an annular recess 73 surrounding the bore at a location spaced axially from recess 68. Hole 72 is tapped between body upper surface 61 and hole 71 to receive a closure plug 74. A horizontal hole 75, aligned with intermediate section hole 52, extends into the right section from its left face 58 to intersect hole 72.

The three body sections are assembled together, as shown in FIG. 1, and are held in this position by means of four bolts, severally indicated at 76 (FIGS. 2-3). The assembled body is thus provided with a supply passage 15, which includes inlet port 18, holes 65 and 66, annular recess 68, and the extension of hole 66, and holes 69, 55 and 56. The body return passage 19 includes outlet port 21, holes 71 and 72, recess 73, and holes 75, 52, 53 (and hole 54, if provided). Holes 56 and 53 open onto the intermediate section upper surface 46 to form ports aligned with the supply and return ports (not shown), respectively, of servovalve 13. Thus, the body supply passage 15 is arranged to convey supply pressure provided to inlet port 18 from an external source (not shown) to one location on the shaft, and to the supply port of valve 13. The body return passage 19 is arranged to convey fluid from the valve's return passage, the chamber housing bearing 34 (if hole 54 is provided), and from another location on the shaft, to outlet port 21.

Shaft 12

The shaft is a horizontally-elongated member having a stepped outer surface, and is operatively arranged in the body bore. Shaft 12 has an annular vertical left end face 78 arranged without or outside the body; an annular vertical right end face 79; and an outer surface including (from left to right in FIG. 4) a cylindrical surface 80 extending rightwardly from left face 78, an annular recess 81, an annular boss having a leftwardly-facing annular vertical shoulder 82, an annular notch 83, a leftwardly-facing annular vertical shoulder 84 rotatably engaging the left section right face 25, a cylindrical surface 85 rotatably embraced by intermediate section arcuate surface 49 (FIG. 3), a rightwardly-facing annular vertical shoulder 86 rotatably engaging the right section left face 58, an annular notch 88, and a cylindrical surface 89 continuing rightwardly therefrom to join right face 79.

The shaft is shown provided with supply and return passages 16, 20. The shaft supply passage 16 includes a horizontal hole 90 extending into the shaft from its left end face 78. The left marginal end portion of hole 90 may be tapped to receive a closure plug 91. Hole 90 is intersected within the body by a radial hole 92 in registry with annular recess 68, and without the body by a radial hole 93 adjacent left end face 78. The shaft return passage 20 includes a horizontal hole 94 extending rightwardly into the shaft from its left end face 78. The left marginal end portion of hole 94 is tapped to receive closure plug 95. Hole 94 is intersected within the body by a hole 96 in registry with annular recess 73, and without the body by a hole 98 arranged adjacent left end face 78. Thus, the shaft supply passage 16 has an inlet port communicating with the body supply passage outlet port, and is arranged to convey fluid to a location (i.e., hole 93) on the shaft beyond the body.

Adjacent its left end, shaft 12 is provided with a tapped hole 99 to accommodate a set screw (not shown) by which some additional structure (not shown in FIGS. 1-4) may be coupled to the shaft for rotation therewith. In the preferred embodiment, a rotary position transducer, generally indicated at 100, is mounted on the body right section and engages the shaft via splined connection 101. This transducer is arranged to sense the angular position of the shaft relative to the body and to provide an electrical feedback signal reflective of such relative position.

Together, the combination of a rotary actuator having a shaft rotatably mounted on the body and a motor operative to urge the shaft to rotate relative to the body, a servovalve arranged to control fluid power to the motor, and a feedback transducer to sense angular position of the shaft relative to the body, constitute a rotary servoactuator.

Valve 13

Valve 13 is preferably an electrohydraulic servovalve which has a supply port (not shown) communicating with hole 56, and has a return port (not shown) communicating with hole 53. Valve 13 also has two control ports $C_1$ and $C_2$, which communicate with the intermediate section bore through holes 102, 103 respectively (FIGS. 2-3). Since valve 13 is individually "old" in this art, it will not be explicitly described. Suffice it to say here that valve 13 is supplied with pressurized fluid via the body and shaft supply passages, communicates with return via the body and shaft return passages, and is selectively operable in response to an electrical command signal to produce differential fluid control of either polarity between ports $C_1$ and $C_2$.

Motor 14

As best shown in FIG. 3, a vane 104 extends radially beyond shaft surface 85 and sealingly engages body surface 48. The vane, thus divides the intermediate section bore into a first chamber 105 arranged to be supplied with control pressure from valve port $C_1$ via hole 102, and a second chamber 106 supplied with control pressure from valve port $C_2$ via hole 102. The differential between control pressure $C_1$ and $C_2$, acting on the opposing faces of the vane, selectively urges the shaft to rotate in either angular direction relative to the body, according to the polarity of the differential.

Operation of Rotary Actuator 10

In the improved rotary actuator, the labyrinth of communicating supply passages function to connect body inlet port 18 to the valve supply port (not shown) and to a commutating port consisting of annular cavity 68 and shaft hole 92, thence to shaft outlet port 93. The commutating port serves to maintain the supply pressure connection to the shaft outlet port throughout the range of shaft rotational displacement. Similarly, the communicating return passage connects body return port 98 to the valve return port (not shown) and to the shaft return inlet port 98 by way of commutating ports 73, 96. Thus, fluid power available between body supply and return ports 18, 21, will be always provided to the servovalve and to the distal end of the shaft beyond the body, independently of the angular position of the shaft relative to the body. This latter feature is deemed particularly advantageous because the fluid supply is made available for use in powering some other mechanism (not shown in FIGS. 1-4) which may be attached to the end of the shaft. At the same time, the supply and return passages are provided within the body and shaft, and obviate the need for external flexible hoses.

Modifications of Rotary Actuator 10

The present invention contemplates that many possible changes and modifications may be made to rotary actuator 10, it being understood that the illustrated embodiment, while presently preferred, is illustrative and only one possible example of what the claims are intended to cover. For example, the body need not invariable be of a three-piece sectional construction, nor need the various parts always have the same shape or function as in the preferred embodiment. While it is preferred that the valve be an electrohydraulic servovalve, other types of valves may be necessarily mounted directly on the body, and the shaft may have different shapes. Also, the commutating ports between the body and the shaft may take various forms, such as annular cavities formed on the shaft communicating with holes formed in the body, or similar cavities and/or holes formed at the end surface of the shaft which would communicate across an interface surface provided between the shaft and the body. The method of construction or assembly is not deemed critical and may be readily changed. For example, the various holes may be cast or otherwise formed, instead of drilled. Other types of motors and/or mechanisms may be substituted for the single vane-type motor of the preferred embodiment. The improved actuator may be serviced by a variety of pressurized fluids (i.e., liquids or gases). In some applications, it may not be necessary to provide the return passages, such as when the valve or other fluid-powered mechanism is vented directly. The salient feature of the invention is to provide an improved rotary actuator in which pressurized fluid provided to the body is conveyed to the valve, and also through the shaft and beyond the body for availability in powering a suitable device or mechanism mounted on the shaft.

Figure 5:
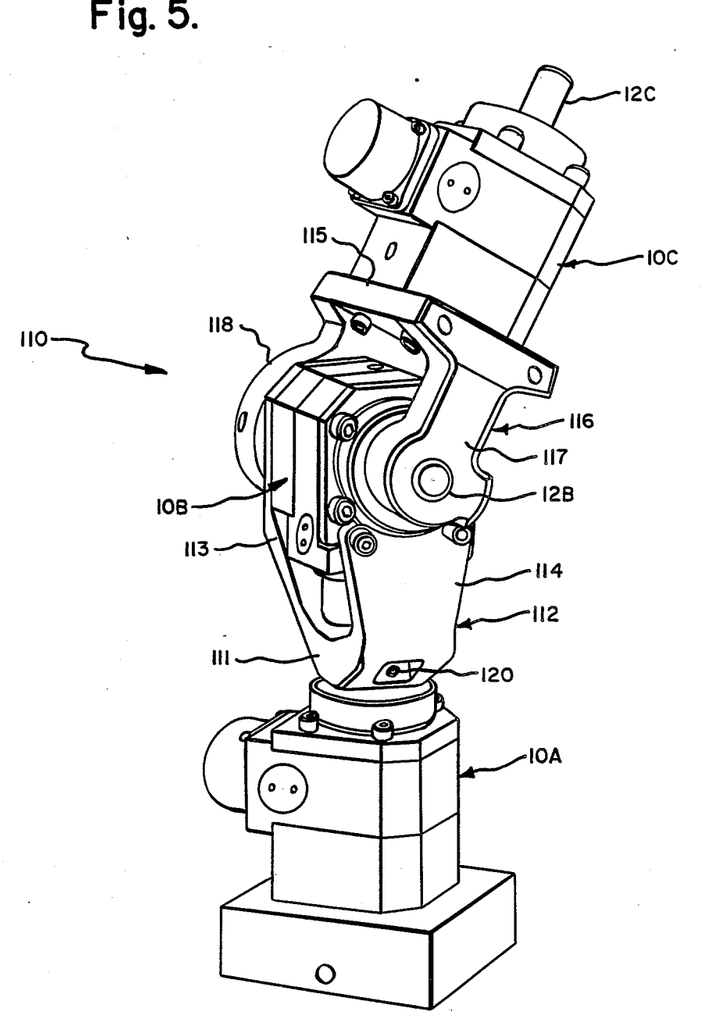
FIG. 5 is a perspective view of a wrist actuator employing three of the improved rotary actuators and two brackets.
Figure 6:
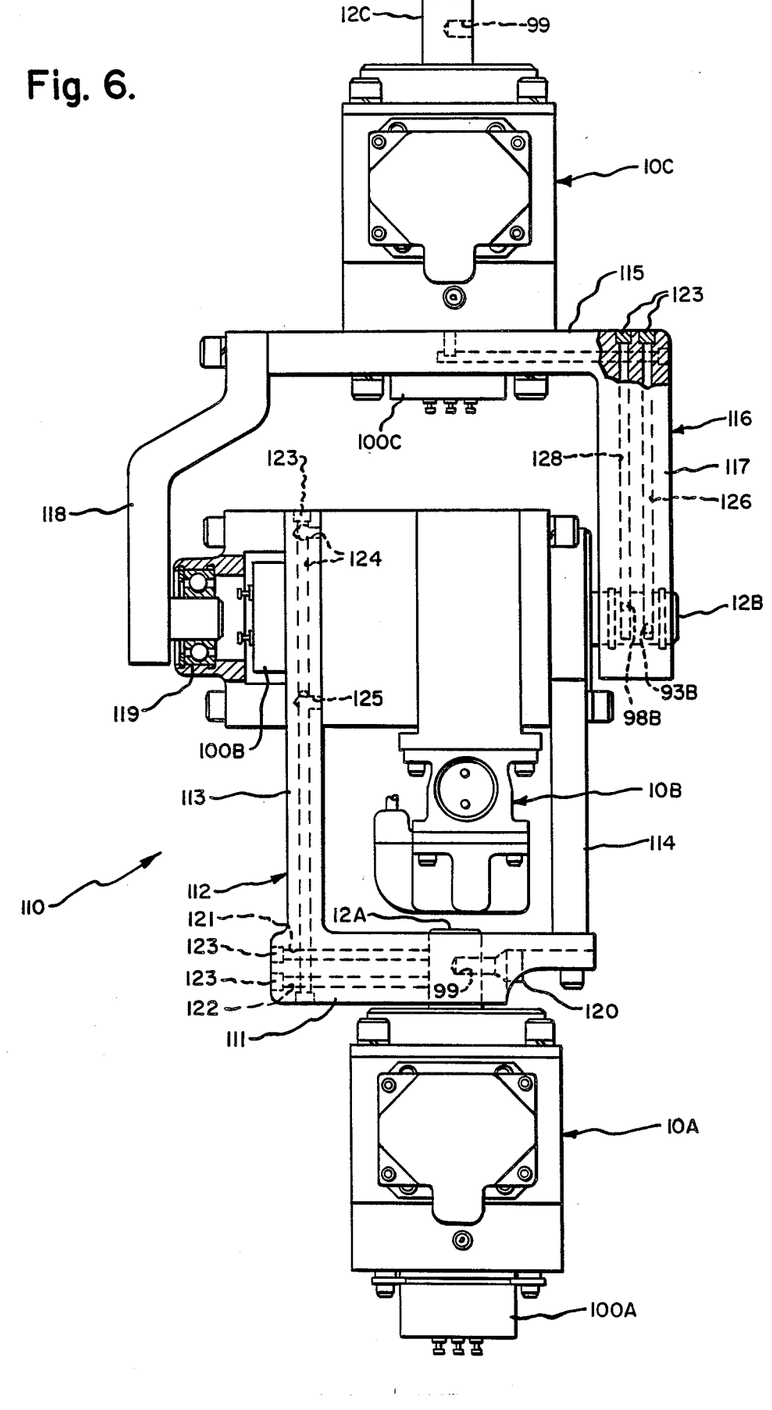
FIG. 6 is a view of the wrist actuator shown in FIG. 5, but showing the wrist actuator as having been articulated to a "flattened" condition.

Wrist Actuator 110 (FIGS. 5-6)

The improved rotary actuator 10 heretofore described may be advantageously employed in an improved wrist actuator, generally indicated at 110 in FIGS. 5 and 6.

Wrist actuator 110 is shown as including a lowermost first rotary actuator 10A, an intermediate second rotary actuator 10B, and an uppermost third rotary actuator 10C. The output shaft 12A (FIG. 6) of the first actuator is arranged vertically in FIG. 5. A base 111 of a somewhat U-shaped first bracket, generally indicated at 112, is mounted fast to the first actuator's output shaft, with its left and right arms 113, 114 embracing the body of second actuator 10B. The base 115 (FIG. 6) of another somewhat U-shaped second bracket, generally indicated at 116, is mounted on the body of the third actuator 10C, and has its right arm 117 mounted fast to the second actuators output shaft 12B. The left arm 118 of second bracket has its distal marginal end portion journalled in a bearing 119 provided on the body of the second actuator 10B. The first actuator 10A may be mounted on a suitable object (not shown), such as the end of a movable robot arm. As best shown in FIG. 6, selective operation of first actuator 10A causes the first bracket member 112 to pivot about the axis of the first actuator's shaft. The third actuator 10C may be selectively operated to cause desired rotation of its shaft. The third actuator's output shaft 12C is adapted to have mounted fast thereon, a suitable tool (not shown) or workpiece (not shown). The first and second actuators 10A, 10B function to position the third actuator's output shaft relative to an object.

One unique feature of wrist actuator 110 is the manner by which the supply and return ports of the three servovalves are connected hydraulically in parallel, so as to obviate the need for external hoses which might otherwise interfere with or by unduly fatigued by articulation of the wrist actuator.

As has been previously described, the supply and return passages communicate the body inlet and return ports (18, 21 in FIGS. 1-4) with the shaft outlet and inlet ports (93, 98 in FIGS. 1-4), respectively. Thus, the fluid power supply between the body ports is available at the end of each shaft.

The first bracket 112 is mounted fast to the first shaft 12A by means of a set screw 120 received in shaft hole 99; and the second bracket is mounted fast to the second actuator output shaft by means of a like set screw. The first bracket includes a pair of horizontal supply and return passageways 121, 122, respectively, which extend rightwardly into the base 111 to communicate with the shaft's supply and return ports 93, 98, respectively. The left marginal end of these first bracket base passageways 121, 122 are closed by suitable plugs 123, 123. A pair of supply and return passages 124, 125 extend downwardly within the first bracket left arm 113 to intersect the base supply and return passages. The ends of these passageways may be closed by suitable closure plugs, again severally indicated at 123. These arm passageways 124, 125 communicate with the supply and return ports 18B, 21B of the second rotary actuator.

In like manner, the second bracket 116 has internal supply and return passages 126, 128 in its base 115 and arm 117, which communicate the second rotary actuator shaft supply and return ports 93B, 98B with the third rotary actuator body supply and return ports 18C, 21C, respectively.

Thus, the supply and return ports of the three servovalves are connected hydraulically in parallel, by a labyrinth of communicating internal passageways. Supply pressure provided to the body supply port 18A of the first rotary actuator, is provided through the first bracket to the body supply port 18B of the second rotary actuator, and is further provided through the second bracket to the body supply port 18C of the third rotary actuator. Similarly, return fluid from the third actuator's return port 21C is provided through the second bracket to the second actuator's return port 21B, and is further provided through the first bracket to the first actuator's return port 21A. Each servovalve may be operated independently of one another to articulate the wrist actuator to the extent desired. In this manner, the improved wrist actuator obviates the need for external hoses providing supply and return connections to each servovalve. It should also be noted that each rotary actuator of the three-axis wrist assembly of FIG. 5 can be equipped with a rotary position transducer as indicated at 100A, B, C so that wrist motion is accomplished by multi-axis, rotary position servoactuators.

Modifications of Wrist Actuator 110

As with the rotary actuator, it is contemplated that many changes and modifications may be made. While the preferred embodiment is shown as including three rotary actuators and two intermediate bracket members, a greater or lesser number may be provided. Rotary actuators other than that specifically disclosed, might readily be substituted. The structure of the brackets might also be changed, as, for example, to communicate with the alternate ports on the end faces of the shafts. Various additional changes and modifications may be made to suit the particular end use.

Therefore, while the presently-preferred embodiments of the improved rotary and wrist actuators have been shown and described, and several modifications of each discussed, persons skilled in this art will appreciate that various additional changes and modifications may be made without departing from the scope of the invention, as defined and differented by the following claims.

What is claimed is:

1. In a rotary actuator including a first body, a first shaft rotatably mounted on said first body and having one portion arranged within said first body and having another portion arranged outside said first body, an electrically-controllable first valve mounted on said first body and having a supply port adapted to be provided with a supply pressure, having a return port, and having a control port, said first valve being selectively operable to provide a control pressure at said control port, and a first motor provided with said control pressure and operative to urge said first shaft to rotate relative to said first body, the improvement which comprises:

a first body supply passage provided in said first body and extending between a first body supply inlet port adapted to be provided with supply pressure, said first valve supply port, and a first body commutating supply outlet port exposed to a surface of said first shaft one portion;

a first shaft supply passage provided within said first shaft and extending between a first shaft supply inlet port communicating with said first body commutating supply outlet port, and a first shaft supply outlet port opening on to a surface of said first shaft other portion; and     an actuator having a member mounted on said first shaft other portion, said member having a member supply inlet port communicating with said first shaft supply outlet port, said actuator being operable independently of said first valve;

whereby said first body supply inlet port will communicating internally with said first valve supply port and with said member supply inlet port.

2. The improvement as set forth in claim 1 wherein said first body commutating supply outlet port is provided by an annular recess encircling said first shaft one portion to maintain communication between said first body supply inlet port and said first shaft supply outlet port independently of the angular position of said first shaft relative to said first body.

3. The improvement as set forth in claim 1 wherein said first shaft other portion surface is an end face of said first shaft.

4. The improvement as set forth in claim 1 wherein said first shaft other portion surface is part of the circumferential surface of said first shaft.

5. The improvement as set forth in claim 1 wherein said first valve is selectively operable to provide differential fluid control between a first control pressure and a second control pressure, and wherein said differential fluid control is provided to said first motor such that said first shaft can be urged to rotate bidirectionally relative to said first body in response to the polarity of said differential control pressure.

6. The improvement as set forth in claim 5 wherein said first motor is a vane-type motor.

7. The improvement as set forth in claim 1 wherein said member has a member return outlet port, and further comprising:

a first shaft return passage provided within said first shaft and extending between a first shaft return inlet port opening on to a surface of said first shaft other portion and communicating with said member return outlet port, and a first shaft return outlet port opening on to a surface of said first shaft one portion at a location spaced from said first shaft supply inlet port; and     a first body return passage provided in said first body and extending between a first body commutating return inlet port communicating with said first shaft return outlet port, said first valve return port and a first body return outlet port;

whereby said first body return outlet port will communicate internally with said first valve return port and with said first shaft return inlet port.

8. The improvement as set forth in claim 7 wherein said first valve is an electrohydraulic servovalve.

9. An actuator assembly, comprising:

a first actuator having an electrically-controllable first valve, said first valve having a supply port, a return port, and a control port, and selectively operable to provide a control pressure at said control port, having a first body, having a first shaft rotatably mounted on said first body and having one portion arranged within said first body and having another portion arranged outside said first body, having a first motor associated with said first valve and selectively operable to urge said first shaft to rotate relative to said first body, and having an internal supply passage within said first body and first shaft and communicating an inlet port on said first body with the supply port of said first valve and with an outlet port on said first shaft other portion;

a first bracket mounted fast to said first shaft other portion for rotation therewith, said first bracket being provided with an internal supply passage therewithin extending between an inlet port in communication with said first shaft supply outlet port, and a bracket supply outlet port; and     a second actuator having an electrically-controllable second valve operable independently of said first valve, said second valve having a supply port, a return port, and a control port, and selectively operable to provide a control pressure at said control port, having a second body, having a second shaft rotatably mounted on said second body and having one portion arranged within said second body and having another portion arranged outside said second body, having a second motor associated with said second valve and selectively operable to urge said second shaft to rotate relative to said second body, and having an internal supply passage within said second body and second shaft and communicating a supply inlet port on said second body with the supply port of said second valve and with a supply outlet port on said second shaft other portion, said second body being mounted on said first bracket with said second body supply inlet port communicating with said first shaft supply outlet port;

whereby said first body supply inlet port will communicate internally with the supply ports of said first and second valves and with said second shaft supply outlet port.

10. An actuator assembly as set forth in claim 9 wherein the axis of said second shaft is substantially perpendicular to the axis of said first shaft.

11. An actuator assembly as set forth in claim 9 and further comprising a first position transducer operatively arranged between said first body and first shaft to provide a negative feedback signal to said first valve.

12. An actuator assembly as set forth in claim 9 and further comprising a second position transducer operatively arranged between said second body and second shaft to provide a negative feedback signal to said second valve.

13. An actuator as set forth in claim 9 and further comprising:

a second bracket mounted fast to said second shaft other portion for rotation therewith, said second bracket being provided with an internal supply passage therewithin extending between a supply inlet port in communication with said second shaft supply outlet port and a supply outlet port;

whereby pressurized fluid supplied to said first body supply port will be supplied internally to said second bracket outlet port.

14. An actuator assembly as set forth in claim 13 and further comprising:

a third actuator having an electrically-controllable third valve operable independently of said first and second valves, said third valve having a supply port, a return port, and a control port, and selectively operable to provide a control pressure at said control port, having a third body, having a third shaft rotatably mounted on said third body and having one portion arranged within said third body and another portion arranged outside said third body, having a third motor associated with said third valve and selectively operable to urge said third shaft to rotate relative to said third body, and having an internal third supply passage within said third body and third shaft and communicating a supply port on said third body with said third valve supply port, said third body being mounted on said second bracket with said third body supply port in communication with said second bracket supply outlet port;

whereby pressurized fluid supplied to said first body supply port will be supplied internally to the supply ports of said first, second and third valves.

15. An actuator assembly as set forth in claim 14 wherein the axis of said third shaft is substantially perpendicular to the axis of said second shaft.

16. A actua or assembly as set forth in claim 14 wherein the axis of said second shaft is substantially perpendicular to the axis of said first shaft, and wherein the axis of said third shaft is substantially perpendicular to the axis of said second shaft.

17. An actuator assembly as set forth in claim 14 and further comprising a third position transducer operatively arranged between said third body and said third shaft to provide a negative feedback signal to said third valve.

18. An actuator as set forth in claim 14 wherein said first actuator has an internal return passage within said first body and first shaft and extending between a return inlet port on said first shaft other portion, the return port of said first valve, and a return outlet port on said first body, whereby said first valve return port and said first shaft return inlet port will severally communicate with said first body return outlet port.

19. An actuator assembly as set forth in claim 18 wherein said first bracket is provided with a return passage therewithin extending between a return inlet port and a return outlet port communicating with said first shaft return inlet port, whereby the return inlet port on said first bracket will communicate with said first body return outlet port.

20. An actuator assembly as set forth in claim 19 wherein said second actuator has an internal return passage within said second body and shaft and extending between a return inlet port on said second shaft other portion, the return port on said second valve, and a return outlet port on said second body, and wherein said second body return outlet port communicates with said first bracket return inlet port, whereby said second valve return port and said second shaft return inlet port will severally communicate with said first body return outlet port.

21. An actuator assembly as set forth in claim 20 wherein said second bracket is provided with a return passage therewithin extending between a return inlet port and a return outlet port communicating with said second shaft return inlet port, whereby said second bracket return inlet port will communicate with said first body return outlet port.

22. An actuator assembly as set forth in claim 21 wherein said third actuator has an internal return passage within said third body and shaft and extending between the return port on said third valve and with a return outlet port on said third body, and wherein said third body return outlet port communicates with said second bracket return inlet port, whereby said third valve return port will communicate with said first body return port.

* * * * *